(12) United States Patent
Jefferies et al.

(10) Patent No.: US 8,327,818 B2
(45) Date of Patent: Dec. 11, 2012

(54) APPARATUS AND METHOD FOR ADDING ONE OR MORE ADDITIVES TO AN ENGINE LUBRICANT

(75) Inventors: Adrian Colin Jefferies, Berkshire (GB); Gordon David Lamb, Berkshire (GB)

(73) Assignee: Castrol Limited, Wiltshire (GB)

( * ) Notice: Subject to any disclaimer, the term of this patent is extended or adjusted under 35 U.S.C. 154(b) by 671 days.

(21) Appl. No.: 12/308,512

(22) PCT Filed: Jun. 12, 2007

(86) PCT No.: PCT/GB2007/002180
§ 371 (c)(1),
(2), (4) Date: Dec. 9, 2009

(87) PCT Pub. No.: WO2007/148047
PCT Pub. Date: Dec. 27, 2007

(65) Prior Publication Data
US 2010/0108018 A1    May 6, 2010

(30) Foreign Application Priority Data
Jun. 21, 2006    (EP) .................................... 06253218

(51) Int. Cl.
*F01M 11/03*    (2006.01)
(52) U.S. Cl. ............. 123/196 A; 123/196 R; 123/196 S; 123/198 D; 210/109; 210/117
(58) Field of Classification Search ............. 123/196 R, 123/196 A, 196 S, 198 D, 198 E; 210/167.02, 210/416.5, 109, 117, 130, 132, 198.1; 184/6.21
See application file for complete search history.

(56) References Cited

U.S. PATENT DOCUMENTS

| | | | |
|---|---|---|---|
| 2,302,552 A | 11/1942 | Johnson | |
| 3,336,223 A | 8/1967 | Kneeland | |
| 3,397,786 A * | 8/1968 | Hultgren | ...................... 210/132 |
| 4,014,794 A | 3/1977 | Lewis | |
| 4,061,572 A | 12/1977 | Cohen et al. | |
| 4,066,559 A | 1/1978 | Rohde | |
| 4,075,097 A | 2/1978 | Paul | |
| 4,075,098 A | 2/1978 | Paul et al. | |

(Continued)

FOREIGN PATENT DOCUMENTS
EP    0 254 776    2/1988
(Continued)

OTHER PUBLICATIONS

International Search Report for PCT/GB2007/002180, mailed Oct. 29, 2007.

(Continued)

*Primary Examiner* — Noah Kamen
*Assistant Examiner* — Hung Q Nguyen
(74) *Attorney, Agent, or Firm* — Nixon & Vanderhye

(57) ABSTRACT

Apparatus and method for adding one or more additives to an engine lubricant, while the lubricant is circulating within an engine having an engine lubricant filter with a by-pass valve which opens when the pressure of the lubricant passing through the filter exceeds a pre-determined back-pressure value in which the apparatus further comprises an additive chamber containing one or more additives operably connected to the by-pass valve such that when the by-pass valve opens at the pre-determined back-pressure, at least some of the lubricant is caused to flow through the additive chamber and contact the one or more additives.

23 Claims, 2 Drawing Sheets

U.S. PATENT DOCUMENTS

Figure 1:
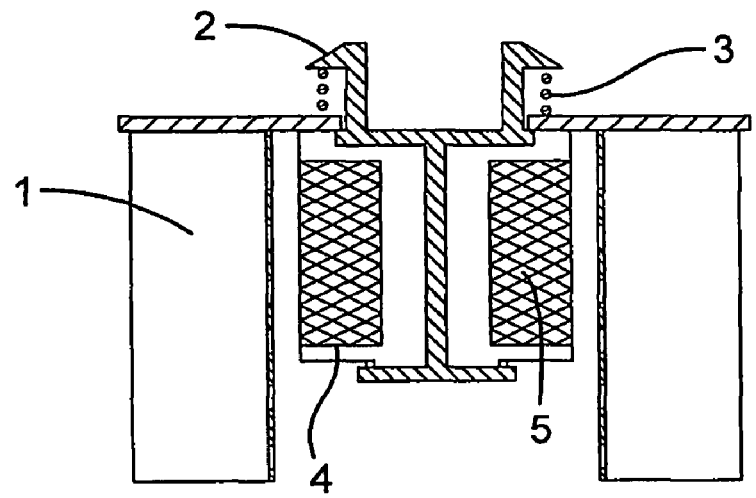

| | | | |
|---|---|---|---|
| 4,144,169 | A | 3/1979 | Grueschow |
| 5,327,861 | A | 7/1994 | Rogalla et al. |
| 5,478,463 | A | 12/1995 | Brownawell et al. |
| 5,718,258 | A | 2/1998 | Lefebvre et al. |
| 6,267,875 | B1 * | 7/2001 | Leo ................................. 210/90 |
| 6,758,969 | B2 * | 7/2004 | Caiozza ........................ 210/223 |
| 6,843,916 | B2 | 1/2005 | Burrington et al. |
| 2005/0019236 | A1 | 1/2005 | Martin et al. |
| 2006/0260874 | A1 | 11/2006 | Lockledge et al. |
| 2006/0261004 | A1 | 11/2006 | Lockledge et al. |
| 2007/0187308 | A1 | 8/2007 | Weinberger |
| 2007/0187316 | A1 | 8/2007 | Weinberger et al. |
| 2007/0187339 | A1 | 8/2007 | Weinberger et al. |

FOREIGN PATENT DOCUMENTS

| | | |
|---|---|---|
| EP | 0 631 803 | 1/1995 |
| JP | 63-5762 | 2/1988 |
| JP | 2005-502803 | 1/2005 |
| JP | 2005-533155 | 11/2005 |
| JP | 2007-526111 | 9/2007 |
| WO | WO 02/096534 A1 | 12/2002 |
| WO | WO 2004/007653 A2 | 1/2004 |
| WO | 2004/067145 | 8/2004 |
| WO | WO 2005/070528 A1 | 8/2005 |
| WO | WO 2006/052495 A2 | 5/2006 |
| WO | WO 2006/076064 A1 | 7/2006 |
| WO | WO 2006/127652 A2 | 11/2006 |

OTHER PUBLICATIONS

Written Opinion of the International Searching Authority for PCT/GB2007/002180, mailed Oct. 29, 2007.

* cited by examiner

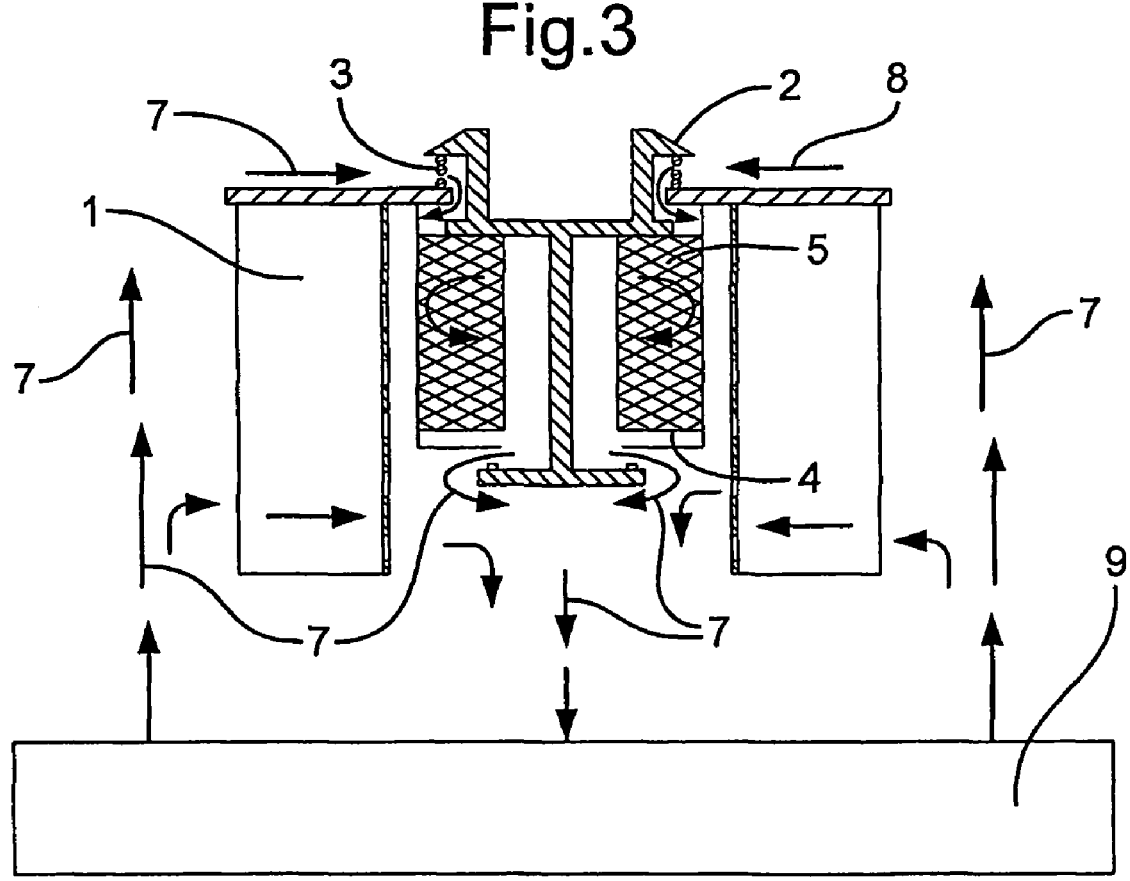

APPARATUS AND METHOD FOR ADDING ONE OR MORE ADDITIVES TO AN ENGINE LUBRICANT

This application is the U.S. national phase of International Application No. PCT/GB2007/002180, filed 12 Jun. 2007, which designated the U.S. and claims priority to European Application No. 06253218.9, filed 21 Jun. 2006, the entire contents of each of which are hereby incorporated by reference.

This invention relates to an apparatus and method for adding one or more additives to an engine lubricant, whilst the lubricant is circulating within an engine.

The addition of additives to an engine lubricant whilst the lubricant is circulating within an engine is desirable in order to replenish the lubricant with additives which become depleted with time, whilst avoiding the need for the lubricant to be drained from the engine and replaced.

U.S. Pat. No. 6,843,916 relates to an engine lubricant additive gel that will slowly release into an oil being filtered and to supplying one or more lubricant additives slowly to an oil by contacting the oil with oil lubricant additives in the form of a lubricant additive gel.

However, such an apparatus and method for adding additives to an engine lubricant whilst the lubricant is circulating within an engine suffer from one or more disadvantages. First of all, such an apparatus and method release the additive(s) continuously over time, rather than only when the additive(s) in the lubricant are depleted, such as to need replenishment. This may result in a reduction of the lubricant's useful life. It may also increase the potential for deposits in the engine and poisoning of exhaust system catalysts. Furthermore, systems using gel type technology may not be compatible with certain anti-wear additives (such as ZDDP).

There remains a need for an apparatus and method for adding one or more additives to an engine lubricant whilst the lubricant is circulating within an engine which avoids, or at least mitigates the above-mentioned disadvantages.

By-pass valves are known in engine lubricant filters which open when the pressure of the lubricant passing through the filter exceeds a pre-determined value.

According to a first aspect of the present invention there is provided an apparatus for adding one or more additives to an engine lubricant whilst the lubricant is circulating within an engine which comprises an engine lubricant filter having a by-pass valve which in use opens when the pressure of the lubricant passing through the filter exceeds a pre-determined back-pressure value, characterised in that the apparatus further comprises an additive chamber containing one or more additives, being operably connected to the by-pass valve such that when the by-pass valve opens at the pre-determined back-pressure, at least some of the lubricant is caused to flow through the additive chamber and contact the one or more additives, before being re-circulated through the engine.

According to a second aspect of the present invention, there is provided a method for adding one or more additives to an engine lubricant whilst the lubricant is circulating within an engine which comprises:
  a) providing the engine with a lubricant system comprising a filter having a by-pass valve which opens when the pressure of the lubricant passing through the filter exceeds a pre-determined back-pressure value;
  b) providing the lubricant system with an additive chamber containing one or more additives, being operably connected to the by-pass valve;
  c) lubricating the engine by circulating the lubricant within the engine; and
  d) passing at least some of the lubricant through the additive chamber to contact the one or more additives when the by-pass valve opens at the pre-determined back-pressure value, before the lubricant is re-circulated through the engine.

The present invention solves the technical problem defined above by contacting the lubricant with the one or more additives in the additive chamber only when a pre-determined back-pressure of the lubricant in the filter causes the by-pass valve to open. Such a pre-determined back-pressure value may be encountered when the lubricant becomes viscous, for example due to oxidation which has occurred over time and/or the presence of soot/sludge. When such a pre-determined back-pressure value is encountered, the by-pass valve opens and at least some of the lubricant passes into the additive chamber to contact the one or more additives which are thus added to the lubricant. The pre-determined back-pressure may additionally or alternatively be encountered during cold start up and/or during other driving situations.

The pre-determined back-pressure of the present invention may be within the range of 6 to 18 psi. (0.4-1.24 bar). Preferably, the pre-determined back-pressure is 6-10 psi (0.4-0.7 bar). The pre-determined back-pressure may be lower than the back-pressures conventionally used for lubricant filter by-pass valves. These conventional back pressures are usually in the range of 8 to 18 psi (0.55-1.24 bar). Different pre-determined back-pressures may be used for different types of engines.

Preferably, in the present invention, the engine is an internal combustion engine. Preferably, in the present invention, the engine is a spark ignition internal combustion engine or a compression ignition internal combustion engine.

Preferably, the by-pass valve is a spring-type valve.

When the lubricant contacts the one or more additives in the additive chamber the additives dissolve in the lubricant.

The additive chamber may be a container having one or more pores. In particular, the container may be a perforate drum or a mesh bag. The rate at which the one or more additives dissolve into the lubricant may be determined by the size and distribution of the pores. Alternatively, the additive chamber may be an oil-soluble bag.

In the method of the present invention, the one or more additives may slowly dissolve into the lubricant over time. Alternatively, all or most of the one or more additives may dissolve into the lubricant all at once.

The one or more additives in the additive chamber may be independently solid, liquid or gel additives, preferably, they are liquid or gel additives.

When the one or more additives are liquid, they may dissolve rapidly in the lubricant to disperse soot and/or sludge in the lubricant and/or to clean the filter.

The additive chamber may contain any type of engine lubricant additive. Preferably, the one or more additives are selected from the group consisting of anti-wear additives, anti-oxidant additives, detergent additives, dispersant additives, cold start additives, and mixtures thereof. Preferably, the one or more additives are selected from dispersant additives, detergent additives, anti oxidant additives and mixtures thereof. Preferably, when the by-pass valve is intended to open due to the pre-determined back-pressure being encountered during cold start up, the additive chamber may contain a cold start-up additive. The one or more additives in the additive chamber may be dissolved in a solvent, for example an ester carrier.

In the method of the present invention the additives in the additive chamber may be refilled or replaced as required.

The invention will now be described by way of example only and with reference to FIGS. 1, 2 and 3.

Figure 2:
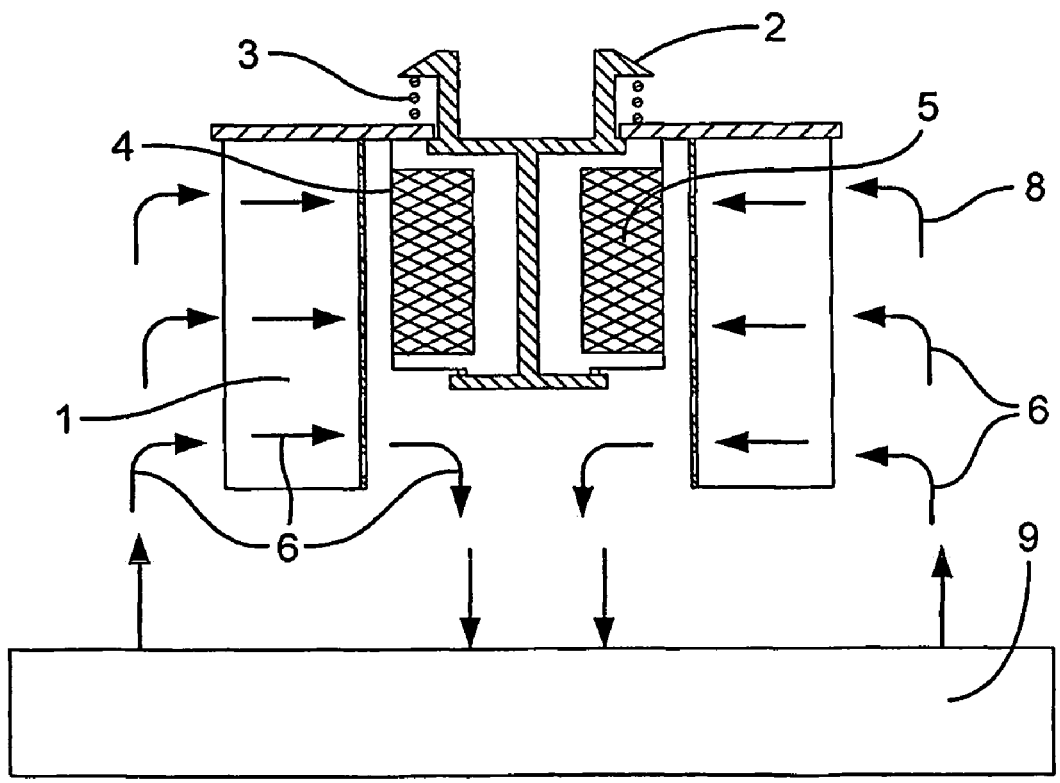

FIG. 1 represents a simplified cross section of apparatus according to the invention, FIG. 2 represents a simplified cross section of apparatus according to the present invention showing flow of lubricant through the filter with the by-pass valve closed; and FIG. 3 represents a simplified cross section of apparatus according to the present invention showing lubricant flow when back-pressure exceeds a pre-determined value and the by-pass valve is open.

Referring to the apparatus in FIGS. 1, 2 and 3, the apparatus comprises an annular engine lubricant filter (1), having a by-pass valve (2), operably connected to a spring (3) to close the by-pass valve. The apparatus also comprises an annular additive chamber (4) which is a mesh bag containing one or more additives (5). The engine (9) is shown schematically in FIGS. 2 and 3.

In use, when the by-pass valve (2) is closed, lubricant (8) flows from the engine (9) through the filter (1) and back to the engine (9) in the direction (6) of lubricant flow shown in FIG. 2.

When the back-pressure of the lubricant (8) passing through the filter (1) exceeds a pre-determined back-pressure value, the by-pass valve (2) acting against the spring (3), opens to cause at least some of the lubricant (8) to flow through the additive chamber (4) and contact the one or more additives (5) before being re-circulated to the engine (9). The direction (7) of lubricant flow to and from the engine (9) with the by-pass valve open, is shown in FIG. 3. When the lubricant (8) contacts the one or more additives (5) in the additive chamber (4), the additives dissolve in the lubricant. This may replenish and/or enhance the lubricant's additive content. This may in turn, clean the filter.

The invention claimed is:

1. An apparatus for adding one or more additives to an engine lubricant while the lubricant is circulating within an engine which comprises an engine lubricant filter having a by-pass valve which in use opens when the pressure of the lubricant passing through the filter exceeds a pre-determined back-pressure value, wherein the apparatus further comprises an additive chamber containing one or more additives, being operably connected to the by-pass valve such that when the by-pass valve opens at the predetermined back-pressure, at least some of the lubricant is caused to flow through the additive chamber and contact the one or more additives, before being re-circulated through the engine.

2. Apparatus as claimed in claim 1 in which the pre-determined back-pressure value is in the range of 6 to 18 psi (0.4 to 1.24 bar).

3. Apparatus as claimed in claim 2 in which the pre-determined back-pressure value is in the range of 6 to 10 psi (0.4 to 0.7 bar).

4. Apparatus as claimed in claim 2 in which the by-pass valve is a spring-type valve.

5. Apparatus as claimed in claim 2 in which the additive chamber contains one or more additives which are liquid or gel additives.

6. Apparatus as claimed in claim 5 in which the additive chamber contains one or more additives selected from the group consisting of anti-wear additives, anti-oxidant additives, detergent additives, dispersant additives, cold start additives and mixtures thereof.

7. Apparatus as claimed in claim 2 in which the additive chamber contains one or more additives selected from the group consisting of anti-wear additives, anti-oxidant additives, detergent additives, dispersant additives, cold start additives and mixtures thereof.

8. Apparatus as claimed in claim 1 in which the by-pass valve is a spring-type valve.

9. Apparatus as claimed in claim 8 in which the additive chamber contains one or more additives which are liquid or gel additives.

10. Apparatus as claimed in claim 9 in which the additive chamber contains one or more additives selected from the group consisting of anti-wear additives, anti-oxidant additives, detergent additives, dispersant additives, cold start additives and mixtures thereof.

11. Apparatus as claimed in claim 8 in which the additive chamber contains one or more additives selected from the group consisting of anti-wear additives, anti-oxidant additives, detergent additives, dispersant additives, cold start additives and mixtures thereof.

12. Apparatus as claimed in claim 1 in which the additive chamber contains one or more additives which are liquid or gel additives.

13. Apparatus as claimed in claim 12 in which the additive chamber contains one or more additives selected from the group consisting of anti-wear additives, anti-oxidant additives, detergent additives, dispersant additives, cold start additives and mixtures thereof.

14. Apparatus as claimed in claim 1 in which the additive chamber contains one or more additives selected from the group consisting of anti-wear additives, anti-oxidant additives, detergent additives, dispersant additives, cold start additives and mixtures thereof.

15. A method for adding one or more additives to an engine lubricant while the lubricant is circulating within an engine which comprises:
   a) providing the engine with a lubricant system comprising a filter having a by-pass valve which opens when the pressure of the lubricant passing through the filter exceeds a pre-determined back-pressure value;
   b) providing the lubricant system with an additive chamber containing one or more additives, being operably connected to the by-pass valve;
   c) lubricating the engine by circulating the lubricant within the engine; and
   d) passing at least some of the lubricant through the additive chamber to contact the one or more additives when the by-pass valve opens at the pre-determined back-pressure value, before the lubricant is re-circulated through the engine.

16. A method as claimed in claim 15 in which the by-pass valve opens when the predetermined back-pressure value is in the range of 6 to 18 psi (0.4 to 1.24 bar).

17. A method as claimed in claim 16 in which the lubricant contacts the one or more additives which are liquid or gel additives.

18. A method as claimed in claim 17 in which the lubricant contacts the one or more additives which are selected from the group consisting of anti-wear additives, anti-oxidant additives, detergent additives, dispersant additives, cold start additives and mixtures thereof.

19. A method as claimed in claim 16 in which the lubricant contacts the one or more additives which are selected from the group consisting of anti-wear additives, anti-oxidant additives, detergent additives, dispersant additives, cold start additives and mixtures thereof.

20. A method as claimed in claim 15 in which the by-pass valve opens when the pre determined back-pressure value is in the range of 6-10 psi (0.4-0.7 bar).

21. A method as claimed in claim 15 in which the lubricant contacts the one or more additives which are liquid or gel additives.

22. A method as claimed in claim 21 in which the lubricant contacts the one or more additives which are selected from the group consisting of anti-wear additives, anti-oxidant additives, detergent additives, dispersant additives, cold start additives and mixtures thereof.

23. A method as claimed in claim 15 in which the lubricant contacts the one or more additives which are selected from the group consisting of anti-wear additives, anti-oxidant additives, detergent additives, dispersant additives, cold start additives and mixtures thereof.

* * * * *